(12) United States Patent
Bellur et al.

(10) Patent No.: US 8,018,840 B2
(45) Date of Patent: *Sep. 13, 2011

(54) INTERFERENCE MITIGATION AND ADAPTIVE ROUTING IN WIRELESS AD-HOC PACKET-SWITCHED NETWORKS

(75) Inventors: Barghav R. Bellur, Fremont, CA (US); Richard G. Ogier, Half Moon Bay, CA (US); Ambatipudi R. Sastry, Fremont, CA (US); Karl Steadman, Menlo Park, CA (US); John Waterston, Mountain View, CA (US)

(73) Assignee: SRI International, Menlo Park, CA (US)

( * ) Notice: Subject to any disclaimer, the term of this patent is extended or adjusted under 35 U.S.C. 154(b) by 1062 days.

This patent is subject to a terminal disclaimer.

(21) Appl. No.: 11/833,355

(22) Filed: Aug. 3, 2007

(65) Prior Publication Data

US 2007/0268880 A1    Nov. 22, 2007

Related U.S. Application Data

(63) Continuation of application No. 10/029,378, filed on Dec. 20, 2001, now Pat. No. 7,342,876.

(51) Int. Cl.
*H04J 1/16* (2006.01)
(52) U.S. Cl. ........................ 370/221; 370/329
(58) Field of Classification Search .......... 370/216–228, 370/242–251
See application file for complete search history.

(56) References Cited

U.S. PATENT DOCUMENTS

| | | | |
|---|---|---|---|
| 5,067,127 A | 11/1991 | Ochiai | |
| 5,754,138 A | 5/1998 | Turcotte et al. | |
| 5,802,484 A | 9/1998 | Hamilton et al. | |
| 5,835,857 A | 11/1998 | Otten | |
| 5,856,804 A | 1/1999 | Turcotte et al. | |
| 6,018,643 A | 1/2000 | Golemon | |
| 6,046,978 A | 4/2000 | Melnik | |
| 6,049,549 A | 4/2000 | Ganz et al. | |
| 6,097,703 A | 8/2000 | Larsen et al. | |
| 6,115,580 A * | 9/2000 | Chuprun et al. | 455/1 |
| 6,115,762 A | 9/2000 | Bell et al. | |
| 6,229,486 B1 | 5/2001 | Krile | |
| 6,252,553 B1 | 6/2001 | Solomon | |
| 6,288,678 B1 | 9/2001 | Gianetti | |
| 6,381,315 B1 * | 4/2002 | Nhaissi | 379/111 |
| 6,671,265 B1 | 12/2003 | Hwang et al. | |
| 7,664,049 B1 * | 2/2010 | Arrakoski et al. | 370/254 |
| 2002/0027894 A1 * | 3/2002 | Arrakoski et al. | 370/338 |
| 2003/0033394 A1 | 2/2003 | Stine | |
| 2003/0109217 A1 * | 6/2003 | Reed et al. | 455/3.05 |

FOREIGN PATENT DOCUMENTS

EP    1119137 A1    7/2001

* cited by examiner

*Primary Examiner* — Phuc Tran (57) ABSTRACT

Described are an apparatus and method for routing packets through a multiple-hop wireless communications network. Interference with packet switched communications carried by radio frequency (RF) over the multiple-hop wireless communications network is detected. In response to information related to the detected interference, a route is adaptively determined for transmitting packets through the multiple-hop wireless communications network that mitigates the effect of the interference on the packets.

20 Claims, 8 Drawing Sheets

INTERFERENCE MITIGATION AND ADAPTIVE ROUTING IN WIRELESS AD-HOC PACKET-SWITCHED NETWORKS

CROSS REFERENCE TO RELATED APPLICATIONS

This application is a continuation of U.S. patent application Ser. No. 10/029,378, filed Dec. 20, 2001, now U.S. Pat. No. 7,342,876 which is herein incorporated by reference in its entirety.

FIELD OF THE INVENTION

The invention generally relates to interference mitigation, and more specifically to interference mitigation in wireless communications networks.

BACKGROUND OF THE INVENTION

As the popularity of wireless communication networks continues to increase, a variety of protocols have emerged such as IEEE 802.11(a), IEEE 802.11(b), HOMERF, HYPERLAN and BLUETOOTH. Some of the protocols operate in the same band of the radio frequency spectrum, e.g., 802.11(b) and BLUETOOTH operate at 2.4 GHz. Consequently, if two networks are placed in close proximity to each other operating different protocols competing for the same radio frequency spectrum, these networks may interfere with each other. Additionally, RF noise from sources such as microwave ovens and cordless telephones, some of which also operate in the 2.4 GHz ISM frequency band, provide a hindrance to overall network performance by introducing noise into the network.

Wireless ad-hoc networks, (i.e., networks without a central point of communications) are subject to other forms of interference as well. For example, unauthorized users can gain access to the network and attempt to degrade network performance by flooding the network with traffic.

SUMMARY OF THE INVENTION

An objective of the invention is to provide a method and apparatus that can detect the presence of an interference source and adaptively control communication between nodes in an attempt to mitigate the effects of the interference.

In one aspect, the invention features a method for routing packets through a multiple-hop wireless communications network. Interference with packet switched communications carried by radio frequency (RF) over the multiple-hop wireless communications network is detected. A route for transmitting packets through the multiple-hop wireless communications network that mitigates the effect of the interference on the packets is adaptively determined in response to information related to the detected interference.

The nodes of the network can operate according to one of the following protocols: IEEE 802.11; BLUETOOTH; HYPERLAN; or HOME RF. In one embodiment, a source of the interference is identified to be a node in the network and the adaptively determined route excludes the interfering node. In another embodiment, one or more nodes within the network that are affected by the interference are identified, and the adaptively determined route excludes the interfered-with nodes. In yet another embodiment, a geographical location of a source of the interference can be approximated, and the adaptively determined route excludes one or more nodes near that location.

Interference can be detected by determining that signals received by a node are of an unauthorized protocol, that an address included in the signals received by a node is from a known unauthorized user, or that a protocol header included in signals received by a node has invalid information. The interference can be detected by a protocol operating at either a physical layer or a data link layer of a protocol stack. A network layer in the protocol stack can determine a route through the network in response to a notification from either the physical or data link layer.

In one embodiment, a protocol operating at a network layer of a protocol stack can detect suspicious communication behavior, and the detection of interference is confirmed by the physical layer in response to being notified by the network layer of the suspicious behavior.

Information related to the detecting of the interference is disseminated to the nodes within the network. Such information can be an identity associated with the source of the interference or the identity of a node within the network that is being interfered with by the interference.

In another embodiment, an antenna pattern of a node in the network is adaptively adjusted in response to the detection of interference. A null can be formed in the antenna pattern in a direction of the interference.

In another aspect, the invention features a protocol stack used by a node to communicate over a wireless communications network. The protocol stack includes a radio frequency (RF) physical layer that detects signals that are attempting to interfere with packet-switched communications at the node and produces a signal that indicates the detection of interference. A network layer receives the signal from the physical layer and produces an alternate route of packets through the network in response to the signal. In one embodiment, the protocol stack includes a data link layer that detects signals that are attempting to interfere with communications at the node and sends a signal to the network layer indicating that interference has been detected.

BRIEF DESCRIPTION OF THE DRAWINGS

The invention is pointed out with particularity in the claims. The drawings are not necessarily to scale, emphasis instead generally being placed upon illustrating the principles of the invention. Like reference characters in the respective drawing figures indicate corresponding parts. The advantages of the invention described above, as well as further advantages of the invention, may be better understood by reference to the description taken in conjunction with the accompanying drawings, in which:

DETAILED DESCRIPTION

Figure 1A:
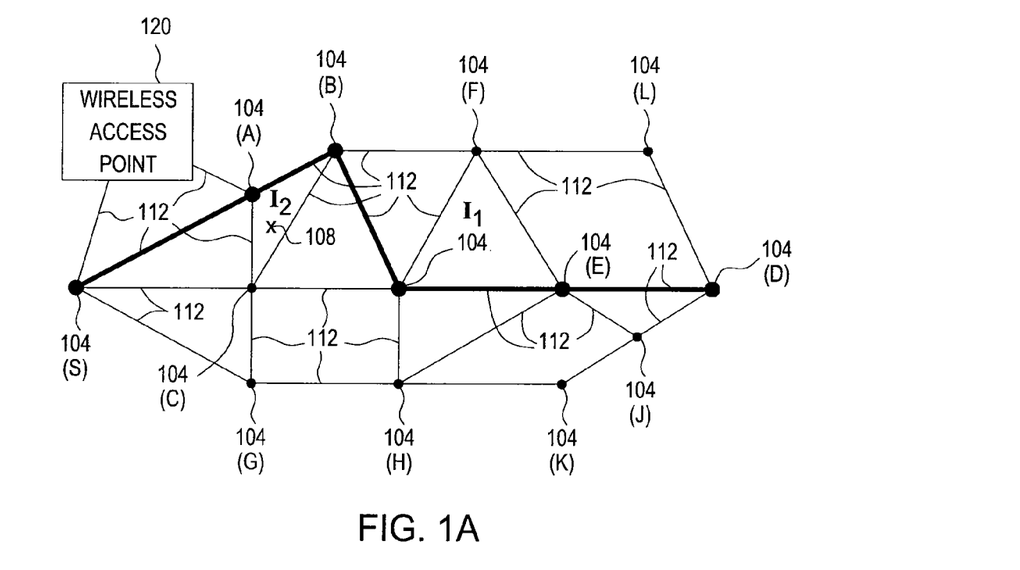
FIG. 1A is a conceptual diagram of a mobile ad-hoc wireless communications network.

FIG. 1A shows an embodiment of a multiple hop (multi-hop) wireless communications network 100 constructed in accordance with the principles of the invention. The network 100 is a packet-switched network in which messages are divided into packets that are transmitted individually over the network 100 and reassembled at their destination to produce the message. The network 100 includes a plurality of computing (or electronic) devices 104 in communication with each other over a shared medium to form a wireless local area network (WLAN). In a shared medium, all computing devices 104 within range of a transmitted communication can hear that communication. In one embodiment, an effective range of communication between computing devices 104 is approximately 150 to 200 feet, which is typically referred to as "short range." The paths of communication between computing devices 104 that are within communication range of each other are represented by communication links 112.

Generally, the computing devices 104 are battery-operated, portable devices capable of wireless communication (e.g., shared medium radio frequency (RF)). Examples of such computing devices 104 include but are not limited to personal digital assistants (PDA), tablet-based and laptop computers, calculators, mobile phones, handheld gaming devices, and picoradios.

Because such computing devices 104 are typically portable and have wireless communication capabilities, their users can move about freely and remain part of the network 100. Further, the users are able to communicate with each other without their communications flowing through a central hub. Networks that operate without a fixed infrastructure (such as a coordinating central hub) are conventionally designated "ad hoc." Consequently, the wireless data communication network 100, of which such computing devices 104 are a part, is generally referred to as a wireless mobile ad-hoc network.

To communicate over the network 100, each computing device 104 has a shared-medium wireless networking transceiver (e.g., IEEE Standard 802.11). The capability to communicate over a shared medium is typically added to the computing device 104 in the form of a network communications card (or, generally, a shared-medium transceiver). The shared-medium transceiver has antennae for communicating with the transceivers of other computing devices 104 in the network 100 and, for some embodiments, with a wireless access point 120. In general, the wireless access point 120 is connected to a wired network (not shown) and has a shared medium wireless networking transceiver, typically in the form of a plug in card. The wireless access point 120 serves as a shared RF wireless transceiver for electronic resources, electronic devices, and other access points connected by wire (e.g., cable) to the wired network.

In the network 100, the state of the communication links 112 (i.e., link state) between computing devices 104 (hereafter referred to as nodes 104) can change frequently because the nodes 104 are mobile. One or more of the nodes 104 may move from one location to another location, dynamically breaking existing links 112 and establishing new links 112 with other nodes 104 as a result. Such movement by one node 104 may not necessarily result in breaking a communication link 112, but may diminish the quality of the communications with another node 104 over that link. In this case, a cost of that link 112 has increased. Although described in the context of a dynamically changing network configuration, the principles of the invention apply also to static network configurations, in which no link-state changes occur due to node mobility.

Each node 104 in the network 100 is responsible for detecting, updating, and reporting changes in cost and up-or-down status of each outgoing communication link 112 to neighbor nodes (i.e., nodes within communication range). In accordance with the principles of the invention, each node 104 can detect a source that interferes with communication over the network 100, hereafter referred to as an interfering or unintended source, inform other nodes 104 of the interfering source, and appropriately adjust the packet routes through the network 100. Also, in one embodiment each node 104 runs a neighbor discovery protocol for detecting the arrival and departure of neighbor nodes and a link-state-routing protocol for disseminating network topology and link-state information, such as information related to an interfering source, to the other nodes 104 in the network 100.

Figure 1B:
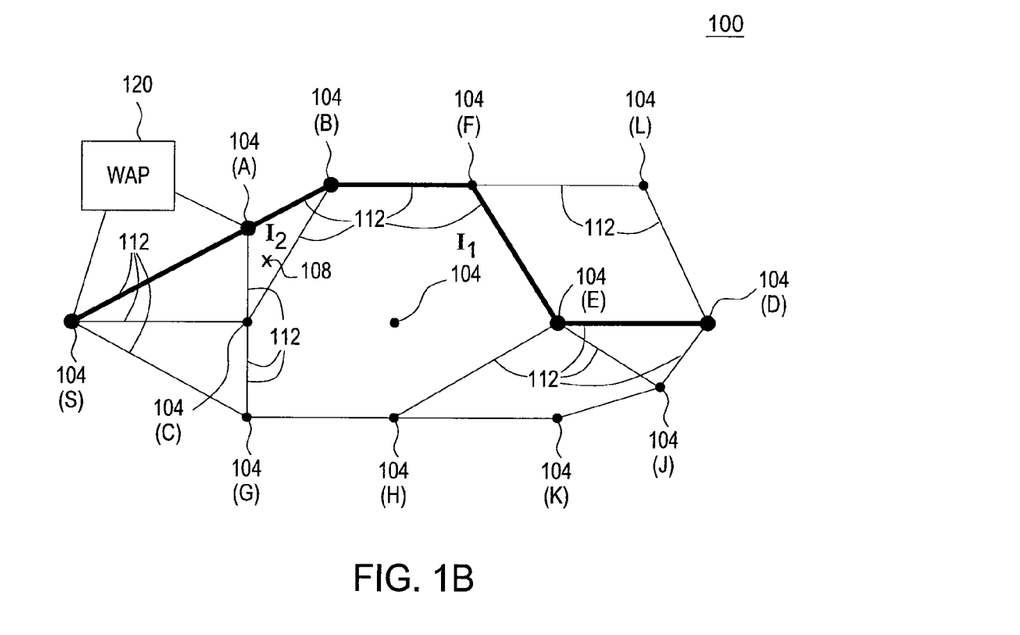
FIG. 1B is a conceptual diagram of the mobile ad-hoc wireless communications network in FIG. 1A after responding to a detected interfering node in accordance with the principles of the invention.
Figure 1C:
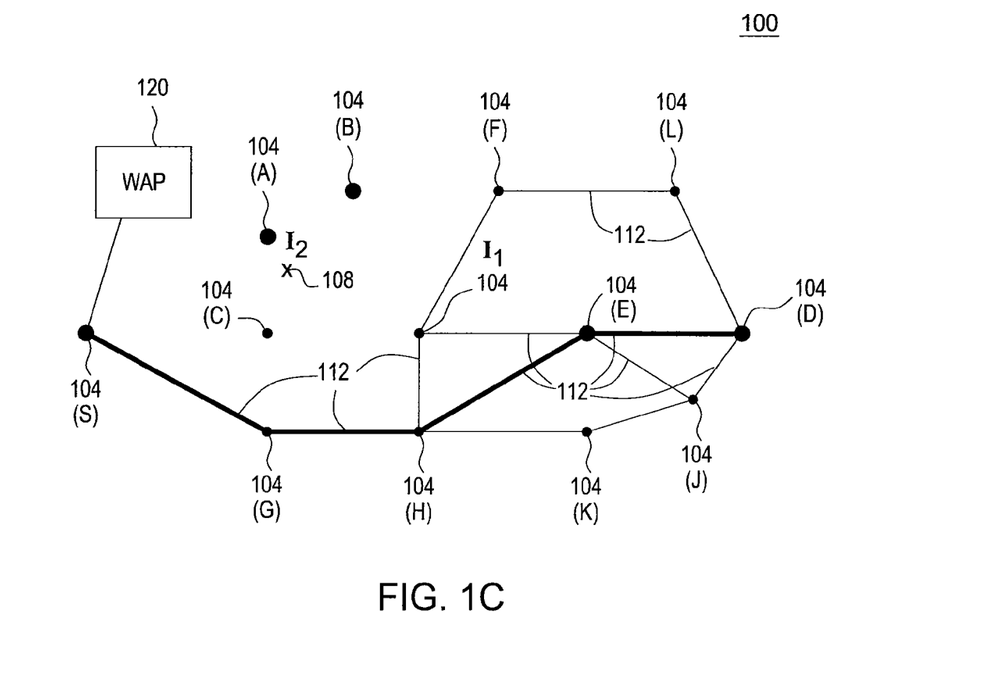
FIG. 1C is a conceptual diagram of the mobile ad-hoc wireless communications network of FIG. 1A after responding to a link (non-node source) interference in accordance with the principles of the invention.

FIGS. 1A-1C illustrate the principles of the invention in an exemplary configuration of the network 100. Referring to FIG. 1A, consider that a source node (S) 104 has determined a route to a destination node (D) 104 that takes multiple hops. This route between nodes S and D is illustrated by a thick outline that passes through intermediate nodes A, B, $I_1$, and E. Each of the intermediate nodes A, B, $I_1$, and E receiving a packet that originated from source S forwards the packet to the next hop in the route towards the destination node D. For forwarding such packets, each intermediate node A, B, $I_1$, and E can use routing tables.

In the example shown in FIG. 1A, node $I_1$ is an interfering node that interferes with the communications passing through node $I_1$. This interference can take one or more of a variety of forms, and thus is generally viewed as behavior that unintentionally or intentionally affects a node's 104 ability to communicate over the network 100. From the viewpoint of the node S 104, the interference can be of the type that affects node S 104 directly. For example, the interfering node $I_1$ can receive packets from node S 104, but not forward them. The interference can be of the type that affects node S indirectly by jamming the ability of one or more of the intermediate nodes (A, B, and E) to receive communication signals. The user of node $I_1$ can create this interference by deliberately emitting signals at an interfering frequency or by executing a denial of service attack by pushing a large amount of traffic. In accordance with the principles of the invention, each node 104 within range can detect the interfering node $I_1$ and disseminate information about the interfering node $I_1$ through the network 100. Each of such nodes 104 can also create a null in the antenna pattern toward the interfering node $I_1$ 104 to mitigate the effects of the interference on that node 104. Further, the nodes 104 can adapt their packet routes to bypass the interfering node $I_1$.

FIG. 1B illustrates a behavior of the exemplary network 100 in the presence of the interfering node $I_1$. In this example, consider that nodes A, B, C, E, F, and H each detect the interference generated by the interfering node $I_1$. Each of such nodes A, B, C, E, F, and H 104 create a null in the antenna pattern toward the interfering node $I_1$ 104, and adapt their routing tables to produce routes that avoid interfering node $I_1$. The interfered-with nodes A, B, C, E, F, and H 104 also disseminate information about the interfering node $I_1$ so that other nodes that do not detect the interference directly, such as node S 104, can produce a new route through the network 100 to the destination node (D) 104. An example of such a new route from source node S to destination node D, which avoids passing through the interfering node I.sub.1, is shown in thick-highlight in FIG. 1B as passing through intermediate nodes A, B, F, and E.

Interference may originate from a source that is not a node in the network 100. Unintentional jamming can result from appliances such as a cordless telephone or a microwave that emits signals in the frequency range used by the nodes 104 to communicate. Another non-node source of interference can be from another computing device 104 that operates at the same communication frequency but according to a different protocol, such as occurs between BLUETOOTH and IEEE 802.11.

Referring back to FIG. 1A, a non-node source of interference (denoted I.sub.2 108) is within sufficient proximity of nodes A, B, and C to cause interference with communications to, from, and through these nodes A, B, and C. Each node A, B, and C detects the interfering source I.sub.2 108, notifies other nodes 104 of the interfering source I.sub.2 108, and adaptively determines at least one route for packets through the network 100 that avoids the interfering source I.sub.2 108. New routes can also avoid nodes that are being interfered with. Further, each of these nodes A, B, and C can create a null in the antenna pattern toward the interfering source I.sub.2 108 to mitigate the effects of the interference on the network 100. An advantage achieved by the adaptive routing is that, unlike a network with a central hub, such as a network of wireless computing devices communicating through one access point, there is no single point of failure. The adaptive routing enables the computing devices to maintain connectivity in the RF dense metropolitans and in the presence of malicious jammers. Generally, a jammer is one who deliberately uses electronic measures that radiate, reradiate, or reflect electromagnetic energy for the purpose of disrupting use of the electronic computing devices, equipment, or systems.

From the information disseminated over the network 100 by the nodes A, B, and C, the source node S 104 can determine a new route through the network 100 to the destination node (D) 104 that avoids each of these interfered-with nodes. FIG. 1C shows in thick highlight one such exemplary route from the source node (S) to the destination node (D) through intermediate nodes G, H, and E, avoiding nodes A, B, and C which are potentially being interfered with.

Network communication among the nodes 104 (and wireless access points 120) is generally conceptualized in terms of protocol layers, such as the physical, data link, network, and application layers, and such protocol layers form a protocol stack. In general, the protocol layers exchange control and status information with one another. For a node 104 transmitting a communication, control starts at the application layer and passes layer by layer to the physical layer, which sends the communication over a communication link to a receiving node 104. The receiving node 104 processes the communication, layer by layer, up the stack of protocol layers, starting at the physical layer and ending at the application layer.

Figure 2:
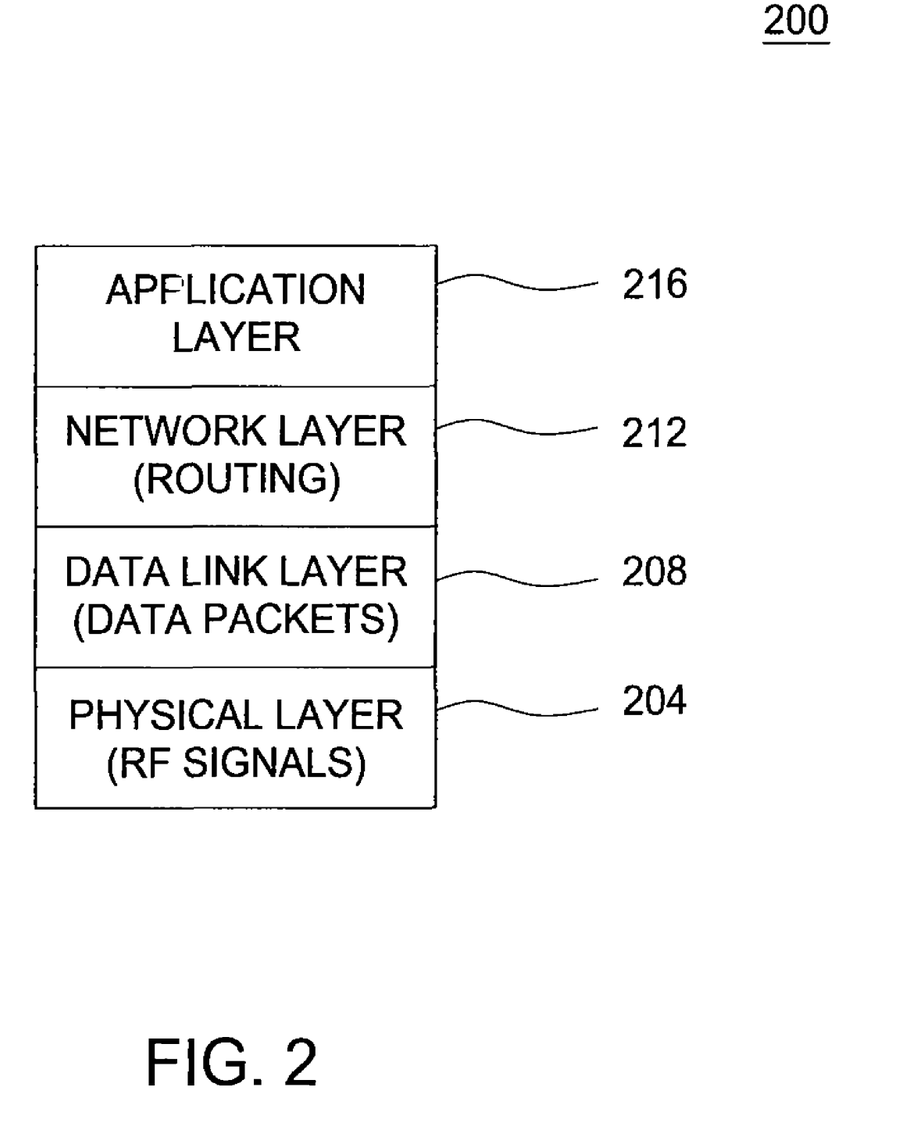
FIG. 2 is an embodiment of a protocol stack of the invention.

FIG. 2 shows one embodiment of a simplified protocol stack 200 by which the nodes 104 communicate with each other to implement the packet-switched network 100. Protocols that implement a packet-switched network divide messages into packets before the messages are sent. Each packet contains the source and destination addresses and the data. Each packet is then transmitted individually and can follow different routes to its destination. The original message is recompiled at the destination after all the packets forming the message arrive.

The simplified protocol stack 200 includes a physical layer 204, data link layer 208, network layer 212, and application layer 212. It is to be understood that the protocol stack 200 can have additional protocol layers to those shown, such as a transport layer, and still practice the principles of the invention.

The protocol used at the physical layer 204 of the protocol stack 200 accommodates the type of physical medium over which the nodes 104 communicate. The physical layer 204 conveys the bit stream in the radio signal through the network 100 at the electrical and mechanical level, and provides the hardware means of sending and receiving data.

In one embodiment, the nodes 104 communicate with each other over links 112 using an IEEE 802.11 wireless communications standard (e.g., IEEE 802.11(a), IEEE 802.11(b), and IEEE 802.11(g)). Other embodiments of wireless communications standards that can be used by the nodes 104 include BLUETOOTH, HYPERLAN, and HomeRF. For a node 104 operating according to the IEEE 802.11, the physical layer 204 specifies the physical aspects of the radio signaling (e.g., frequency hopping spread spectrum (FHSS), and direct sequence spread spectrum (DSSS)). Currently, an IEEE 802.11(b) node using DSSS can operate at up to speeds of 11 Mbps in the 2.4-GHz to 2.4835-GHz spectrum. The data link layer 208 encodes and decodes data packets into bits and handles errors in the physical layer 204, flow control and frame synchronization. In one embodiment, the data link layer 208 comprises two sub-layers: a Logical Link Control (LLC) layer and a Media Access Control (MAC) layer (the lower of the two sub-layers). The MAC sub-layer controls access to the physical transmission medium; the LLC layer controls frame synchronization, flow control, and error checking.

For a node 104 operating according to the IEEE 802.11, the MAC layer supports a variation of Carrier Sense Multiple Access with Collision Avoidance (CSMA/CA) with positive acknowledge. When a node 104 wants to transmit, the node 104 first checks the shared medium to see if the medium is free. If the shared medium is free, then the node 104 is permitted to transmit. The node 104 receiving the transmission dispatches an acknowledgment to inform the transmitting node 104 station that a collision did not occur. If the transmitting node 104 does not receive an acknowledgment packet, the transmitting node 104 resends the packet.

To minimize collisions due to nodes that do not hear each other, the IEEE 802.11 standard defines a virtual-carrier sense mechanism. According to this mechanism, the transmitting node 104 first sends a Request to Send (RTS), which is a short packet that contains the source and destination addresses, and the duration of the transmission. After receiving the RTS packet, the receiving node 104 replies with a short packet called Clear to Send (CTS), which includes the same duration-of-transmission information. Nodes that receive the RTS, CTS, or both RTS and CTS packets then consider the medium busy for that duration. Thus, the possibility of collisions in the medium is reduced.

The network (or routing) layer 212 provides a protocol for forwarding and routing packets through the network 100, by creating logical paths for transmitting packets from node to node.

Interference Detection

During operation of the network 100, each of the physical 204, data link 208 and network layers 212 participate in the detection of interference in the network 100. An advantage of the invention is that nodes 104 are able to detect the interference at those protocol layers closer to the source of the problems, namely the lowest layers 204, 208, 212 of the protocol stack 200. At the lowest layer, such as at the physical layer 204, it is possible to separate the interfering signal from the actual signal.

The physical layer 204 can detect interference in one or more ways. In general, software that implements the physical layer protocol examines header information of the packets received over the shared medium. Such header information is typically intended for use by the higher protocol layers of the protocol stack 200. In one embodiment, the physical layer 204 examines the header information of received packets to determine if the packets follow a particular expected protocol. For example, if the node 104 is operating according to the 802.11 standard, and received packets do not have the appropriate frame format, then the physical layer 204 can conclude that the node's 104 communications are being interfered with. The physical layer 204 can employ threshold criteria before reaching this conclusion, such as strength of received interference and duration of interference.

In another embodiment, the physical layer 204 examines the header information to determine an address of the source of the packet ("source address"). The source address can be a MAC address or an IP address of the node transmitting the packet. The software operating at the physical layer 204 can then compare the source address with a list of known unauthorized nodes. If the source address is listed therein, then the source of the packet is an interfering node. Conversely, the physical layer software can compare the source address with a list of known authorized nodes. If the source address is not found in that list, the source of the packet is identified as an interfering source.

Upon detecting interference, the physical layer 204 notifies the network layer 212, so that the network layer 212 can act accordingly (e.g., adapt packet routes in response to the interference). As an example, the physical layer 204 can accomplish this notification by setting or unsetting a bit in one of the header fields, which is subsequently examined by network layer software. The physical layer 204 can also control transceiver operation (described below), in response to detection of the interference, to mitigate the effects of the interfering signals on the communication of the node 104. In one embodiment, the physical layer 204 tests periodically if the interfering behavior from the interfering source has ceased by restoring the reception and transmission antenna pattern to its previous pre-interference state. If so, the physical layer 204 notifies the network layer 212 of the change of state, and the network layer 212 adapts its packet routes accordingly.

At the data link layer 208, software can examine the information fields of RTS and CTS packets to determine if the node 104 is receiving false RTS or CTS packets or a flood of RTS/CTS packets. For example, each RTS packet has information fields for a receiver address and a transmitter address and each CTS packet has an information field for a receiver address that the data link software can compare against a list of authorized (or unauthorized) addresses. These fields store the MAC address of the transmitting or receiving device. If any of the addresses are invalid (i.e., not a proper MAC address) or on a list of unauthorized addresses (or not on a list of authorized addresses), then the data link layer 208 can conclude that the sender of the packet (RTS or CTS) is an interfering source. As with the physical layer 204, the data link layer 208 can employ threshold criteria to determine if the receipt of the invalid or unauthorized RTS or CTS packet rises to the level of interference.

As another example, the data link layer software can examine the duration field, which is part of both RTS and CTS packets, to determine if a valid duration is being used. An invalid duration (e.g., one of excessive duration or a CTS duration that does not match a corresponding RTS duration) can be an indicator of a node attempting to interfere with network communications.

Upon detecting interference, the data link layer 208 notifies the network layer 212. As an example, the data link layer 208 can notify the network layer 212 by setting or unsetting a bit in one of the header fields associated with the received packet, which is subsequently examined by network layer software.

At the network layer 212, software can perform traffic analysis to identify various types of attacks. For example, by examining the address field of packet traffic the network layer 212 can determine whether excessive traffic is originating from a particular node in the network 100. As another example, using traffic analysis the network layer 212 can detect another type of suspicious network behavior, such as when an interfering node is receiving but not forwarding packets. This type of suspicious behavior can be detected, for example, when a higher protocol layers such as the transport layer retransmits packets because the destination node never received the original packet.

In the event of detecting suspicious behavior, the network layer 212 can communicate with the physical layer 204 to confirm, if possible, that the suspect node is in fact behaving maliciously. If the physical layer 204 confirms the malicious behavior, then the physical layer 204 communicates this result to the network layer 212, and can alter the transceiver reception and transmission patterns to avoid communications to, from, and through that malicious node.

When notified of interference, whether by the physical layer 204 or by the data link layer 208, software operating at the network layer 212 determines one or more routes through the network 100 that bypass an interfering node producing the interfering signals or nodes that are being interfered with. Such a determination of routes can also be based on messages received from other nodes in the network 100 that have also detected the interference. In one embodiment, the determination of routes is achieved by dropping existing routes that include the interfering node, by dropping routes that include interfered-with nodes, or by dropping route that include both. The node 104 subsequently uses those routes through the network 100 that remain.

As an example, the determination of routes involves establishing new routes through the network 100 by calculating a cost for a plurality of routes that exclude the interfering node. A best route can then be selected based on route cost. In general, link cost can be calculated by one of a variety of cost functions. For example, one cost function can include the number of hops that a neighbor node is away from the destination node; the further away from the destination node, the higher the link cost for transmitting a packet to that node. As further examples, a cost function can include congestion or bandwidth information over particular links 112 or at particular nodes 104—the more congested or the lower the bandwidth, the higher the cost to forward packets over those links 104 or through those node s104.

As yet another example, the nodes 104 can employ a cost function that includes calculating the power consumption information for the transmitting node. For example, the transmitting node can have accumulated link-state information that shows that less power is needed to transmit a packet to one neighbor node than to another neighbor node. Accordingly, the best route is the route that consumes less power. This power calculation need not correlate with distance. For instance, a transmitting node may have one neighbor node that is geographically nearer than another neighbor node, but behind an obstacle that negatively affects the signal quality, and therefore requires greater power to communicate therewith.

As another embodiment, the network layer 212 can divide packets and redundant checksums over disjoint paths that lead to the destination node. Disjoint paths are separate paths that have only the source and destination nodes in common; that is, no intermediate node appears in each path. For example, in FIG. 1A there are three disjoint paths from the source node S 104 to the destination node D 104. A first path traverses nodes S, A, B, F, L, and D; a second path traverses nodes S, C, I.sub.1, E and D; and a third path traverses nodes S, G, H, K, J, and D. The network layer 212 operates to send one packet over a first path, a second packet over a second path, and checksums over a third path. This prevents an interfering node (e.g., node I.sub.1) that is intermediate between the source and destination nodes from viewing all of the packets. Further, attempts to modify the data by the interfering node should not escape detection. Also, data lost on any one path can be recovered by the information obtained along the other paths.

Figure 3A:
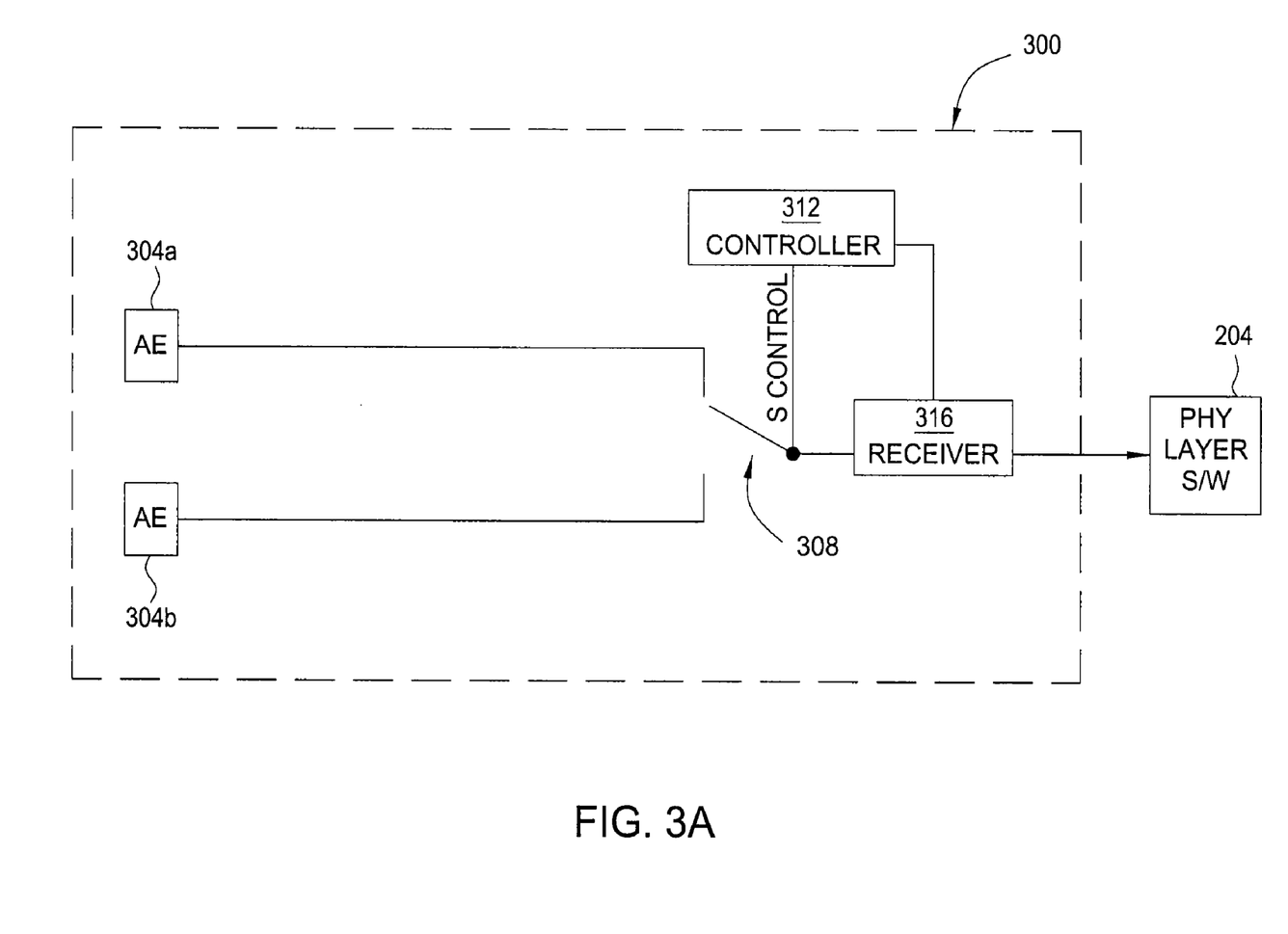
FIG. 3A is a block diagram of a first embodiment of a network communications card.

At the physical layer 204 of the protocol stack 200 is a network communications card that transmits and receives information for the nodes 104. FIG. 3A shows one embodiment of a network communications card 300 that is added to the nodes 104 to provide wireless communications capability. The network communications card 300 includes two antenna elements 304a and 304b, referred to generally as 304, a switch 308, a controller 312, and a receiver 316. Antenna elements 304 are in communication with switch 308. Switch 308 is in communication with and controlled by controller 312. Only one of the antenna elements 304 is connected to receiver 316 at one specific time.

In operation, a single antenna element 304 is selected in response to control signal SCONTROL generated by controller 312. Switch 308 connects one of the antenna elements 304 to receiver 316 in response to a determination of the quality of reception of each antenna element 304 relative to each other. As the configuration of the mobile ad-hoc network 100 changes or reception quality falls below a threshold, switch 312 is connected to the one of the antenna element 304 which provides an appropriate level of signal reception. Accordingly, when an interfering source is detected, as described below, the controller 312 causes the switch 312 to select the antenna that is less affected by the interference.

Figure 3B:
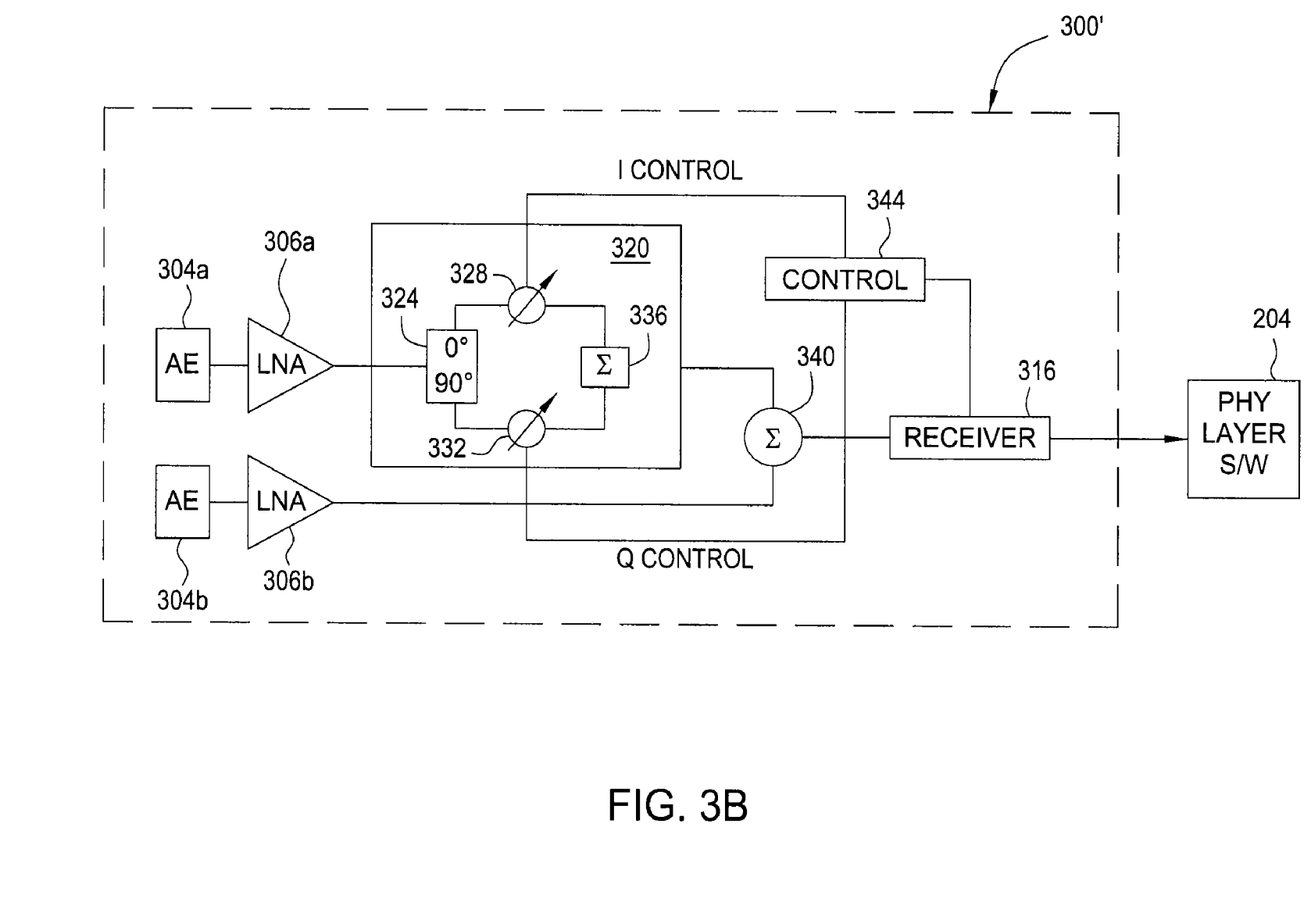
FIG. 3B is a block diagram of a second embodiment of a network communications card.

FIG. 3B shows another embodiment of a network communications card 300' that provides wireless communications capability to the nodes 104. Network communications card 300' includes antenna elements 304a and 304b, referred to generally as 304, low noise amplifiers (LNA) 306a and 306b, referred to generally as 306, receiver 316, a vector modulator 320, a summer 340 and a controller 344. Antenna element 304a is in communication with low noise amplifier 306a, which is in communication with vector modulator 320. Antenna element 304b is in communication with low noise amplifier 306b. Vector modulator 320 and low noise amplifier 306b are in communication with RF summer 340. The low noise amplifiers 306ab maintains a high quality received signal may need to be inserted in the paths leading from antenna element 304a to the RF summer 340. This low noise amplifier 306a overcomes the signal loss of the in-line vector modulator 320, which would degrade the receiver noise floor. In order to provide signal level balance the low noise amplifier 306a is paired with the low noise amplifier 306b in path from the antenna element 304b to the RF summer 340. These low noise amplifiers 306 replace a front-end amplifier within the receiver 316. Controller 344 is in communication with vector modulator 320. Receiver 316 receives the output of summer 340 and is in communication with controller 344.

In such an embodiment, antenna elements 304a and 304b function as a two-element (i.e., dual) antenna array. As such, the directionality of the transmit and receive patterns of the dual-antenna array can be exploited by the controller 344 in various ways (other than to mitigate interference or to avoid communicating through an interfering node). For example, the directionality and shape of the antenna patterns can be adapted to achieve noise reduction and to improve the signal-to-noise (SNR) ratio of communications between nodes 104. Additional advantages can be realized by such an implementation without departing from the spirit and scope of the invention.

In one embodiment, vector modulator 320 includes a signal splitter and a 90.degree. phase shifter. 324, an in-phase amplitude control (I control) 328, a quadrature-phase amplitude control (Q control) 332, and a signal combiner and 0.degree. phase shifter 336. Signal splitter and 90.degree. phase shifter 324 are in communication with antenna element 304a. I control 328 and Q control 332 are in communication with signal combiner and 0.degree. phase shifter 336 as well as controller 344. Signal combiner and 0.degree. phase shifter 336 are in communication with summer 340.

In operation, antenna elements 304 receive and transmit information packets over the mobile ad-hoc network 100. The received signals are processed to determine if an interference source is within communications range of the receiving node. In response, controller 344 adjusts I control 328 and Q control 332 using control signals ICONTROL and QCONTROL respectively.

In one embodiment, ICONTROL and QCONTROL are generated external to the vector modulator 320. In one embodiment, ICONTROL and QCONTROL are generated by a digital-to-analog (D/A) converter within controller 344, with one D/A for I control 328 and one D/A for Q control 332. Control signals ICONTROL and QCONTROL may be adaptive. For adaptive adjustment of I control 328 and Q control 332, the controller 344 monitors the output of receiver 316. The output is used to determine the quality of the signal input to receiver 316, such as the received signal to noise ratio or the recovered bit error rate of the received signal. These factors are in turn used to determine the presence of an unintended (interfering) signal source, for example, a microwave oven or a cordless telephone. Controller 344 adjusts the I control 328 and Q control 332 signals ICONTROL and QCONTROL via an algorithm implemented in software to adaptively mitigate the effects of the interfering signal.

As signals pass through the vector modulator 320, the phase and amplitude of the desired received signals and the interfering signal are varied. The signals from the I and Q signal paths are combined by the 0 degree phase shift signal combiner 336 and pass through to the summer 340. At this point, the signals from antenna element 304b and the I and Q signal paths are combined at a summer 340.

In general, the relative phase of the desired signal and interfering signals is different in the unweighted and weighted signal paths, due to the differing distances of the signal sources to each antenna element. If the interfering signal is adjusted to be opposite in phase but at the same amplitude in the weighted path relative to the unweighted path, the interfering signal will cancel, and an improvement in signal to interference ratio results.

In essence, the vector modulator 320 functions as a variable phase and amplitude network. By adjusting the phase of a desired signal and that of at least one interfering signal received by antenna element 304a relative to the desired signal and the at least one interfering signal received by the antenna element 304b, the spatial direction of the radiation pattern null of network communications card 300 is changed. Therefore, there is a range of control settings on the I and Q signal paths of vector modulator 320 that produces a reduction of interference for a bandwidth segment at receiver 316. For example, if the vector modulator 320 controls are set such that no signal is available at the output of the vector modulator 320, then the interference is not decreased. However, if the control setting is such as to steer the radiation pattern null of network communications card 300 towards interfering source or node, then the interference is noticeably reduced.

In one embodiment, in order to ascertain that an interfering signal still exists, the physical layer 204 listens at a low duty cycle to the link 212 without nulling being enabled. This snapshot of data is used to characterize the signal environment to determine if the interferer is still present, and thus if the null should be formed in that direction. Otherwise, the radiation pattern null is disabled, allowing for signal reception in the direction of the former interferer.

Figure 4A:
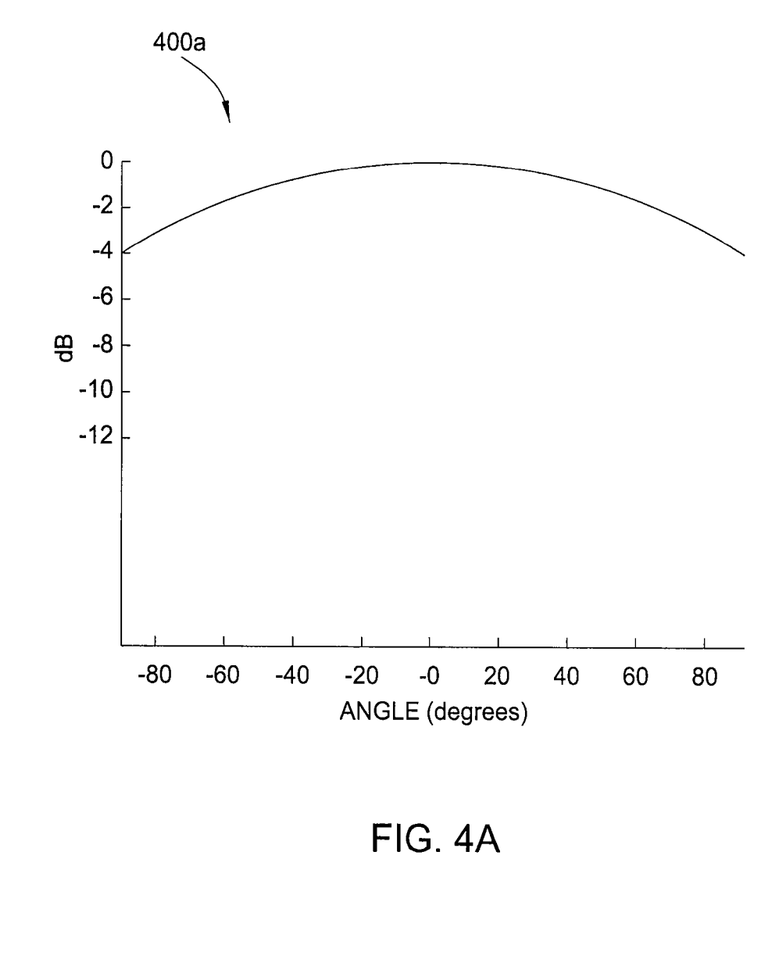
FIG. 4A is an embodiment of an antenna pattern produced by the first embodiment of the network communications card.

By way of example, FIG. 4A shows the antenna pattern 400 of the embodiment of the network communications card 300 of FIG. 3A. Switching between like antenna elements 304a and 304b affects a relative direction of the receive antenna pattern 400a, but does not alter the shape of the pattern.

Figure 4B:
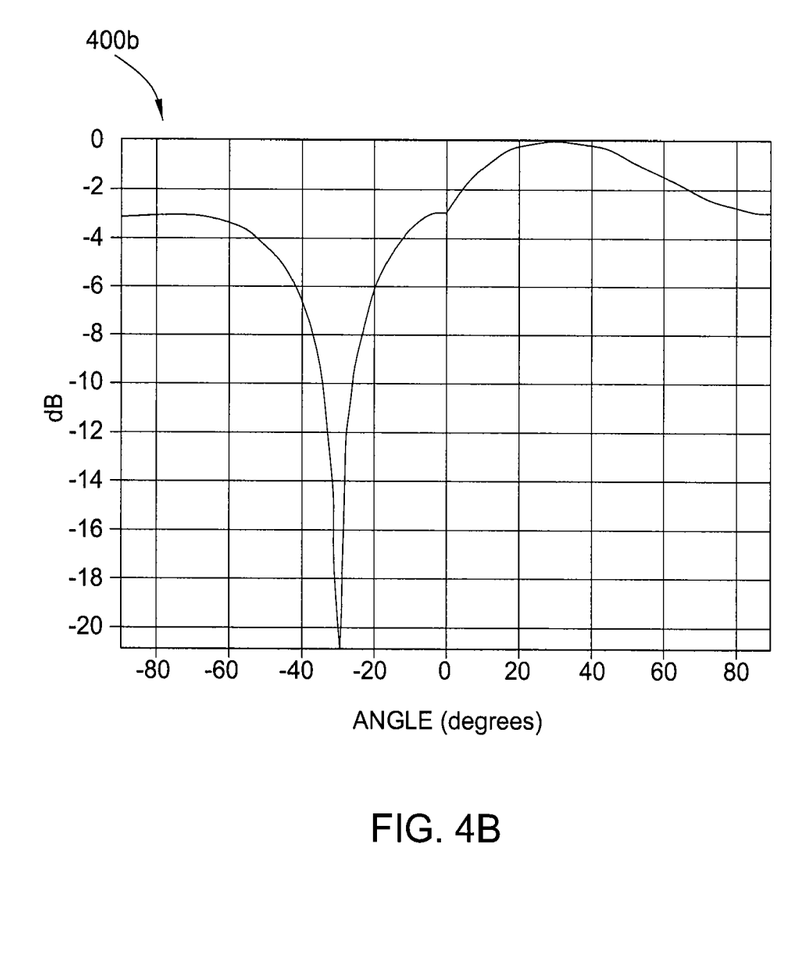
FIG. 4B is an embodiment of an adaptive antenna pattern formed by the second embodiment of the network communications card.

FIG. 4B depicts a receive antenna pattern 400b for the embodiment of the network communications card 300' of FIG. 3B. In response to the controller 344 adjusting the I 328 and Q 332 control, a null 404 forms in the antenna pattern 400b in the direction of an unintended (interfering) signal source. As the configuration of mobile ad-hoc network 100 changes and new interference sources are determined, the null of the antenna pattern is shifted to form in the direction of the detected interference source.

Figure 5:
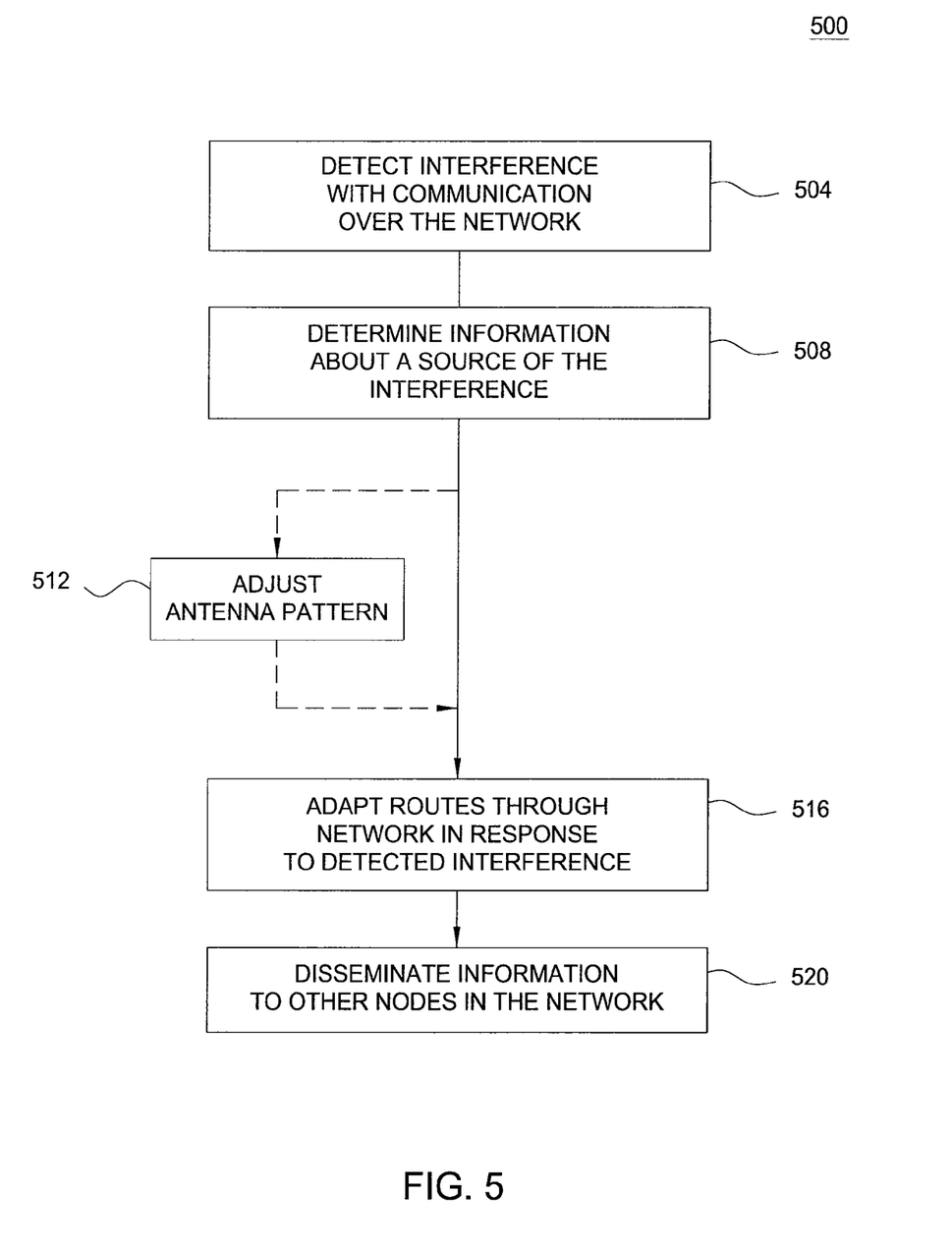
FIG. 5 is a flow diagram illustrating an embodiment of a process by which the nodes in the wireless communications network respond to interference detected in the network.

FIG. 5 shows an embodiment of a process 500 by which each node 104 in the network 100 detects an interfering source and adaptively routes packets through the network 100 in response to detecting the interfering source. For illustration purposes, although described from the viewpoint of the node B 104 in the exemplary network 100 shown in FIG. 1A, it is to be noted that the process 500 is performed by each node 104 and, in some embodiments, each wireless access point 120 in the network 100.

In step 504, node B detects interference with its communication over the network 100. Node B can detect the interference at the physical layer 204, the data link layer 208, or the network layer 212, depending upon the type of interference being encountered. For example, the physical layer 204 detects jamming as described above, the data link layer 208 detects hogging of resources such as occur during denial of service attacks, and the network layer 212 detects network behavior anomalies, such as packets not forwarded.

In step 508, node B determines information about the interfering source. In one embodiment, this information can be the name or other identification, such as Internet Protocol (IP) address or Media Access Control (MAC), of the interfering node. In another embodiment, the information is related to a geographical location of the interfering source. For example, the transceiver of node B can determine direction and distance of the interfering source from the signals received by the antennae. As another example, the node B can approximate the location (e.g., using triangulation techniques) from direction and distance information received from two or more other nodes 104 in the network 100 that have also detected the presence of the interfering source.

In step 512, node B can optionally adjust the antenna pattern, as described above, such that the effects of the interference on received communications are mitigated.

In step 516, node B adapts its routes through the network 100 for transmitting packets. In one embodiment, if the interfering source is a node 104 in the network 100 (e.g., node I in FIG. 1A), node B can drop any routes that include that node. In another embodiment, node B can drop routes with nodes that have been identified as being interfered with. Also, the transceiver of node B can adjust the antenna pattern to control the direction of transmitted communications so that the interfering node or interfered-with nodes do not receive any packets originating from or forwarded by node B.

In step 520, node B communicates to other nodes 104 in the network 100 that the interfering source has been detected. This communication can include such information as described above, namely an identification of or location of the interfering source. The communication can also include a flag that indicates whether node B is being interfered with. The direction of the transmission can be controlled, as described above, to keep the interfering node from receiving this communication and thus from recognizing that it has been detected.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for use by a node to route packet traffic through a multiple-hop wireless communications network, the method comprising:
    detecting an interference in a form of signals that are attempting to interfere with packet-switched communications at the node that are carried by radio frequency (RF) over the multiple-hop wireless communications network;
    determining, in response to information related to the detected interference, a route for transmitting packets through the multiple-hop wireless communications network that mitigates an effect of interference on the packets; and
    disseminating to other nodes in the multiple-hop wireless communications network an identity of at least one node associated with the interference.

2. The method of claim 1 further comprising identifying a source of the interference to be a first node in the multiple-hop wireless communications network, and wherein the determined route excludes the first node.

3. The method of claim 1 further comprising identifying one or more nodes interfered with by the interference, and wherein the determined route excludes the one or more of the interfered-with nodes.

4. The method of claim 1 further comprising approximating a geographical location of a source of the interference, and wherein the determined route excludes one or more nodes near that geographical location.

5. The method of claim 1 wherein the detecting the interference includes determining that signals received by a node are of an unauthorized protocol.

6. The method of claim 1 wherein the detecting the interference includes determining that an address included in signals received by a node is an address of a known unauthorized source.

7. The method of claim 1 wherein the detecting the interference includes determining that a protocol header included in signals received by a node has invalid information.

8. The method of claim 1 further comprising operating a protocol at a physical layer of a protocol stack that detects the interference.

9. The method of claim 8 wherein the determining the route is performed by a network layer protocol in the protocol stack in response to a notification from the protocol of the physical layer of the interference.

10. The method of claim 1 further comprising operating a protocol at a data link layer of a protocol stack that detects the interference.

11. The method of claim 10 wherein the determining the route is performed by a network layer protocol in the protocol stack in response to a notification from the protocol of the data link layer of the interference.

12. The method of claim 1 further comprising operating a protocol at a network layer of a protocol stack that detects suspicious communication behavior.

13. The method of claim 12 wherein the detecting the interference is accomplished by a physical layer protocol of the protocol stack in response to a notification from the protocol of the network layer of the suspicious network behavior.

14. The method of claim 1 further comprising adjusting an antenna pattern of a node in the multiple-hop wireless communications network in response to detecting the interference.

15. The method of claim 14 wherein the adjusting the antenna pattern includes forming a null in the antenna pattern in a direction of the interference.

16. The method of claim 1 wherein the identity identifies a source of the interference.

17. The method of claim 1 wherein the identity identifies a node in the multiple-hop wireless communications network that is being interfered with by the interference.

18. The method of claim 1 further comprising identifying a source of the interference to be a node in the multiple-hop wireless communications network, calculating a cost function for a plurality of routes from a sending node to a destination node that exclude the interfering node, and selecting the route with a lowest cost function.

19. The method of claim 1 wherein nodes in the multiple-hop wireless communications network operate according to one of protocols selected from a group comprising of: IEEE 802.11, BLUETOOTH, HYPERLAN and HOMERF.

20. A method for use by a node to route packet traffic through a multiple-hop wireless communications network, the method comprising:
    detecting an interference in a form of signals that are attempting to interfere with packet-switched communications at the node that are carried by radio frequency (RF) over the multiple-hop wireless communications network, wherein the detecting is performed by a protocol operating at at least one of: a physical layer of a protocol stack, a data link layer of the protocol stack, or a network layer of the protocol stack; and
    determining, in response to information related to the detected interference, a route for transmitting packets through the multiple-hop wireless communications network that mitigates an effect of interference on the packets.

* * * * *